(12) United States Patent
Beale (10) Patent No.: US 8,405,601 B1
(45) Date of Patent: Mar. 26, 2013

(54) COMMUNICATION SYSTEM AND METHOD

(75) Inventor: Marc Ivor John Beale, Malvern (GB)

(73) Assignee: Malvern Scientific Solutions Limited (GB)

( * ) Notice: Subject to any disclaimer, the term of this patent is extended or adjusted under 35 U.S.C. 154(b) by 1697 days.

(21) Appl. No.: 09/980,955

(22) PCT Filed: Sep. 6, 2000

(86) PCT No.: PCT/GB00/02243
§ 371 (c)(1),
(2), (4) Date: Dec. 4, 2001

(87) PCT Pub. No.: WO00/75765
PCT Pub. Date: Dec. 14, 2000

(30) Foreign Application Priority Data

Jun. 9, 1999 (GB) .................................... 9913283.9
Oct. 15, 1999 (GB) .................................... 9924342.0

(51) Int. Cl.
*G09G 5/00* (2006.01)
(52) U.S. Cl. .......... 345/156; 345/161; 345/163; 345/175
(58) Field of Classification Search .................. 345/156, 345/160, 171, 172, 173, 168, 169, 161, 163; 341/21–23; 400/87, 486
See application file for complete search history.

(56) References Cited

U.S. PATENT DOCUMENTS

| 4,458,238 | A | * | 7/1984 | Learn | 341/20 |
| 5,008,847 | A | | 4/1991 | Lapeyre | |
| 5,367,625 | A | * | 11/1994 | Ishitani | 715/810 |
| 5,483,235 | A | * | 1/1996 | Hanson et al. | 341/20 |
| 5,682,151 | A | * | 10/1997 | Oliveros | 341/23 |
| 5,745,717 | A | * | 4/1998 | Vayda et al. | 715/834 |
| 5,786,809 | A | | 7/1998 | Ryzhov et al. | |
| 5,808,567 | A | * | 9/1998 | McCloud | 341/20 |
| 6,448,987 | B1 | * | 9/2002 | Easty et al. | 715/834 |
| 6,545,669 | B1 | * | 4/2003 | Kinawi et al. | 345/173 |
| 6,549,219 | B2 | * | 4/2003 | Selker | 715/834 |
| 2004/0104896 | A1 | * | 6/2004 | Suraqui | 345/168 |
| 2004/0162133 | A1 | * | 8/2004 | Jackson | 463/20 |

FOREIGN PATENT DOCUMENTS

| EP | 0858023 | 8/1999 |
| GB | 2290400 | 12/1995 |
| WO | 9630822 | 10/1996 |

* cited by examiner

*Primary Examiner* — William Boddie
*Assistant Examiner* — Leonid Shapiro
(74) *Attorney, Agent, or Firm* — Ira S. Dorman (57) ABSTRACT

A communication system comprises means defining a communication region, such as a touch-pad (151), having associated therewith a plurality of symbols (155) or the like and being responsive to a user-controlled pointing device whereby a desired symbol or the like can be selected by movement of the pointing device in a predetermined direction within the region (151).

31 Claims, 7 Drawing Sheets

COMMUNICATION SYSTEM AND METHOD

This invention relates to a communication system and method of communicating which may be employed, for example, for the entry of symbols such as text and/or other symbols by means other than a keyboard and/or for the entry of data, such as for controlling electronic equipment, and for the output of symbols and/or data.

The "QWERTY" keyboard is the most widely used symbol/text entry system. However, for certain applications its many keys, often over 100, occupy an inconveniently large area or, in the alternative, are inconveniently small for ready access by fingers or another pointing device. A mobile user can additionally find the need for a horizontal support surface at a convenient height problematic.

Many other symbol/text entry systems have been developed, including some for single-handed use. None has acquired a degree of popularity on the scale of the QWERTY keyboard. Some require the user to remember complex keystrokes or combinations of keystrokes which make them difficult to use. Such known symbol/text entry systems are particularly difficult for use by the casual user where a small number of relatively simple movements is to be desired. Speed of symbol/text entry is important to both novice and skilled users.

GB-A-2 290 400 describes a visual communications apparatus which determines a user's selection by monitoring the eye position to determine which of the characters is being observed.

There is known from EP-A-0 858 023 a symbol entry system and method in which a visible focus is responsive to commands given by a user through a handheld remote command unit, so that the user can move the focus to a particular symbol in a symbol chart and select such a symbol for entry in a symbol entry region.

According to U.S. Pat. No. 5,008,847 a conventional keyboard is replaced by a virtual keyboard on a computer screen, selection of keystrokes being made by a mouse, or the like, positioning a cursor at a desired key for keyswitch operation.

There is known from U.S. Pat. No. 5,786,809 a method of entry of symbolic information into a computer system in which a set of symbols is positioned relative to, an output position, a predetermined symbol being entered by moving a pointer to the predetermined symbol and selecting the symbol.

There is known from WO-A-96 30822 a method and apparatus for data entry incorporating a plurality of selectable regions. A menu option may be selected by clicking on an associated selectable region, by dwelling on it for a selection threshold period or by a cursor path toward the selectable region, or by a combination thereof.

It is therefore an object of the present invention to provide a communication system and method which overcomes or at least reduces the disadvantages of known systems.

According to one aspect of the present invention there is provided a communication system comprising means defining a communication region having associated therewith a plurality of symbols or the like (such as data items) and being responsive to a user-controlled pointing device whereby a desired symbol or the like can be selected wherein a desired symbol or the like can be selected by detecting movement of the pointing device along a predetermined bearing within the communication region, the predetermined bearing being substantially parallel to a direction of the desired symbol or the like relative to a central region of the communication region, but not consisting of movement toward a selectable region associated with a desired symbol or the like.

According to another aspect of the present invention there is provided a method of communication in which a plurality of symbols or the like are associated with a communication region and a desired symbol or the like is selected by movement of a pointing device wherein a desired symbol or the like is selected by detecting movement of the pointing device along a predetermined bearing within the communication region, the predetermined bearing being substantially parallel to a direction of the desired symbol or the like relative to a central region of the communication region, but not consisting of movement toward a selectable region associated with a desired symbol or the like.

Thus, movement of a single pointing device in the plane of the communication region can select any one of a number of symbols.

A plurality of symbol entry regions may be provided each having associated therewith a plurality of symbols and each being responsive to the user-controlled pointing device whereby a desired symbol can be selected by movement of the pointing device in a predetermined direction (or bearing) within the region with which the desired symbol is associated.

The communication system may be in the form of a symbol entry system, such as for replacing a keyboard, or may be in the form of a data entry system, such as for controlling one or more functions of electronic equipment.

Movement in a predetermined direction may be detected, for example, by analysing the direction (or bearing) of movement of the pointing device rather than the location thereof. Thus, in practice the location of movement need not be restricted to an ideal direction in the form of a line from a central area of a region to a desired symbol, but rather may be generally parallel to the ideal direction. Such a method of analysis is particularly beneficial in that it makes the system very tolerant of imprecision relating to the pointing device. Thus, the movement may be offset relative to the location of the symbol to be selected, or may have a variable length. Further the actual direction need not be precise, but may be within a tolerance which can readily be determined by the angular separation of adjacent symbols (for example about +/−22.5 degrees for eight symbols disposed about a central point). Moreover, the movement need not be linear, curved movement being accommodated by determining an average direction, for example using the start and finish points of a movement. Where a plurality of cells are provided, the midpoint of a pointing movement may be used to determine the cell to be selected. Alternatively, movement in a predetermined direction may be detected, for example, by analysing the location at which the movement intersects with a boundary of the region or other suitable boundary such as that of a touch-sensitive area.

In one embodiment of the invention there is a plurality of cells (for example, eight) within a single communication (symbol entry or function entry) region, each cell having associated therewith a plurality of symbols (for example, three) or the like arranged in a linear manner, a desired symbol or the like being selected by movement in a predetermined direction relative to the respective cell followed by continued movement in the same direction or movement at an angle thereto to select the desired symbol or the like associated with the respective cell. The cells may be provided substantially in an octagonal arrangement.

In another embodiment of the invention there is a plurality (for example, eight) communication (symbol entry or function entry) regions, each region having associated therewith a plurality of symbols (for example, four) or the like arranged in an orthogonal manner, a desired symbol or the like being selected by movement within the region having the desired symbol or the like associated therewith in a predetermined orthogonal direction relative to the desired region. The eight regions may be provided substantially in an octagonal arrangement.

In a further embodiment of the invention there are four communication (symbol entry or function entry) regions, each region having associated therewith six or eight symbols or the like arranged in a predetermined manner, for example at the corners of a square and substantially midway between predetermined adjacent corners, such as along the top and bottom of each region, a desired symbol or the like being selected by movement within the region having the desired symbol or the like associated therewith in a predetermined direction relative to the desired symbol or the like. The four regions may be provided substantially in a quadrilateral arrangement or substantially in a linear arrangement.

In a further embodiment of the invention there are three communication (symbol entry or function entry) regions, each region having associated therewith eight symbols or the like arranged in a predetermined manner, for example at the corners of a square and substantially midway between adjacent corners, a desired symbol or the like being selected by movement within the region having the desired symbol or the like associated therewith in a predetermined direction relative to the desired symbol or the like. Where the three regions are intended to be operated with a user's finger, the regions may be arranged in a substantially linear manner with the central region displaced so as to accommodate the user's middle finger length.

In a further embodiment of the invention there are two communication (symbol entry or function entry) regions, each region having associated therewith a plurality of symbols (for example, eight) or the like arranged in a predetermined manner, for example at the corners of a square and substantially midway between adjacent corners, a desired symbol or the like being selected by movement within the region having the desired symbol or the like associated therewith in a predetermined direction relative to the desired symbol or the like.

In a further embodiment of the invention there are five communication (symbol entry or function entry) regions, each region having associated therewith up to four symbols or the like arranged in a predetermined manner, for example at the corners of a square, a desired symbol or the like being selected by movement within the region having the desired symbol or the like associated therewith in a predetermined direction relative to the desired symbol or the like. The regions may arranged in a substantially linear manner. Two sets of communication regions may be provided, one for each hand. Alternatively, or additionally, two sets of communication regions may be arranged substantially parallel to each other for alternative symbol or the like entry. Further communication regions may be provided if desired.

One or more further regions may be provided separated from the first-mentioned regions for toggling between the first-mentioned set of symbols or the like and one or more further sets of symbols or the like to be associated with each of the regions. For example, a plurality of further regions may be provided around the periphery of the first-mentioned regions and/or a single further region may be provided centrally of the first-mentioned regions.

Means may be provided for selecting a further symbol or the like arranged within an area encompassed by or adjacent to the first-mentioned symbols or the like of each region by tapping the area within the desired region.

Means may be provided for selecting further symbols or the like by employing a different form of movement from that required to select from the basic symbols. For example the speed of movement (slow or fast) or a combination of movements may be used. Combined movements may include a linear movement with a dwell at the beginning and/or end thereof (for example to select upper case letters), a linear movement in a first direction followed by one or more further linear movements reversing the preceding movement, two sequential linear movements either at right-angles to each other or at another predetermined angle to each other (for example to mimic all or part of the desired symbol or the like). It should be noted such different forms of movement do not constitute tracing out the symbol shape: only a small number of simple movements need to be remembered.

The region or regions may be provided on a touch-sensitive pad or screen or may be displayed on a screen with symbols or the like being selected by way of a remote pointing device (such as a computer mouse or trackball or an optical tracking device). The symbols may be provided on the region or regions, may be positioned adjacent (for example immediately above or below) thereto, or may be displayed on or adjacent the region or regions only if required by the user. Alternatively, the region or regions may be provided on sheet material in order that a user can indicate each desired symbol or the like in turn.

According to a further aspect of the present invention there is provided a communication (symbol output) system comprising means defining a communication (symbol output) region having associated therewith a plurality of symbols or the like, and means movable within the region whereby a desired symbol or the like can be indicated by movement of the movable means in a predetermined direction or at a predetermined location within the region.

According to a further aspect of the present invention there is provided a method of communication (symbol output) in which a plurality of symbols or the like are associated with a communication (symbol output) region and a desired symbol or the like is indicated by movement of a movable means in a predetermined direction or at a predetermined location within the region.

The movable means may comprise a visual means and/or a tactile means.

A plurality of symbol entry regions may be provided each having associated therewith a plurality of symbols and each being responsive to the user-controlled pointing device whereby a desired symbol can be selected by movement of the pointing device in a predetermined direction within the region with which the desired symbol is associated.

A separate movable means may be provided for each region, for example a pin which is movable in orthogonal and/or diagonal directions. Alternatively, the movable means may be provided at each symbol or the like location, such as an extendable pin or a piezo device.

In one embodiment of the invention there are eight communication (symbol output) regions, each region having associated therewith a plurality of symbols (for example, four) or the like arranged in an orthogonal manner, a desired symbol or the like being indicated by movement of the movable means within the region having the desired symbol or the like associated therewith in a predetermined orthogonal direction. The eight regions may be provided substantially in an octagonal arrangement.

In another embodiment of the invention there is a plurality of cells (for example, eight) within a single communication (symbol output) region, each cell having associated therewith a plurality of symbols (for example, three) or the like arranged in a linear manner, a desired symbol or the like being indicated by movement of the movable means in a predetermined direction relative to the respective cell followed by continued movement in the same direction in the same direction or movement at an angle thereto to indicate the desired symbol or the like within the respective cell. The eight cells may be provided substantially in an octagonal arrangement.

In a further embodiment of the invention there are four communication (symbol output) regions, each region having associated therewith eight symbols or the like arranged in a predetermined manner, for example at the corners of a square and substantially midway between adjacent corners, a desired symbol or the like being selected by movement of the movable means within the region having the desired symbol or the like associated therewith in a predetermined direction. The four regions may be provided substantially in a quadrilateral arrangement or substantially in a linear arrangement.

In a further embodiment of the invention there are three communication (symbol output) regions, each region having associated therewith eight symbols or the like arranged in a predetermined manner, for example at the corners of a square and substantially midway between adjacent corners, a desired symbol or the like being indicated by movement of the movable means within the region having the desired symbol or the like associated therewith in a predetermined direction.

Means may be provided for indicating further symbols or the like by employing a combination of movements of the movable means. Combined movements may include a linear movement with a dwell at the beginning and/or end thereof, a linear movement in a first direction followed by a further linear movement in the opposite direction, two sequential linear movements either at right-angles to each other or at another predetermined angle to each other (for example to mimic all or part of the desired symbol or the like).

The present invention can be used for communication (symbol entry) with a computer and like equipment, mobile telephones including WAP telephones, televisions (whether interactive or not), alarm clocks, audio systems for vehicles and domestic use and the like.

For a better understanding of the present invention and to show more clearly how it may be carried into effect reference will now be made, by way of example, to the accompanying drawings in which.

Conventional keyboards are operated by pressing one or more keys at one or more specific locations. The keys are not triggered until a specific pressure is exceeded or a predetermined proximity is attained. Each key generates a single specific output, although the output may be modified in dependence on the use of further keys, such as a "shift", "alt" or "caps lock" key.

Figure 1:
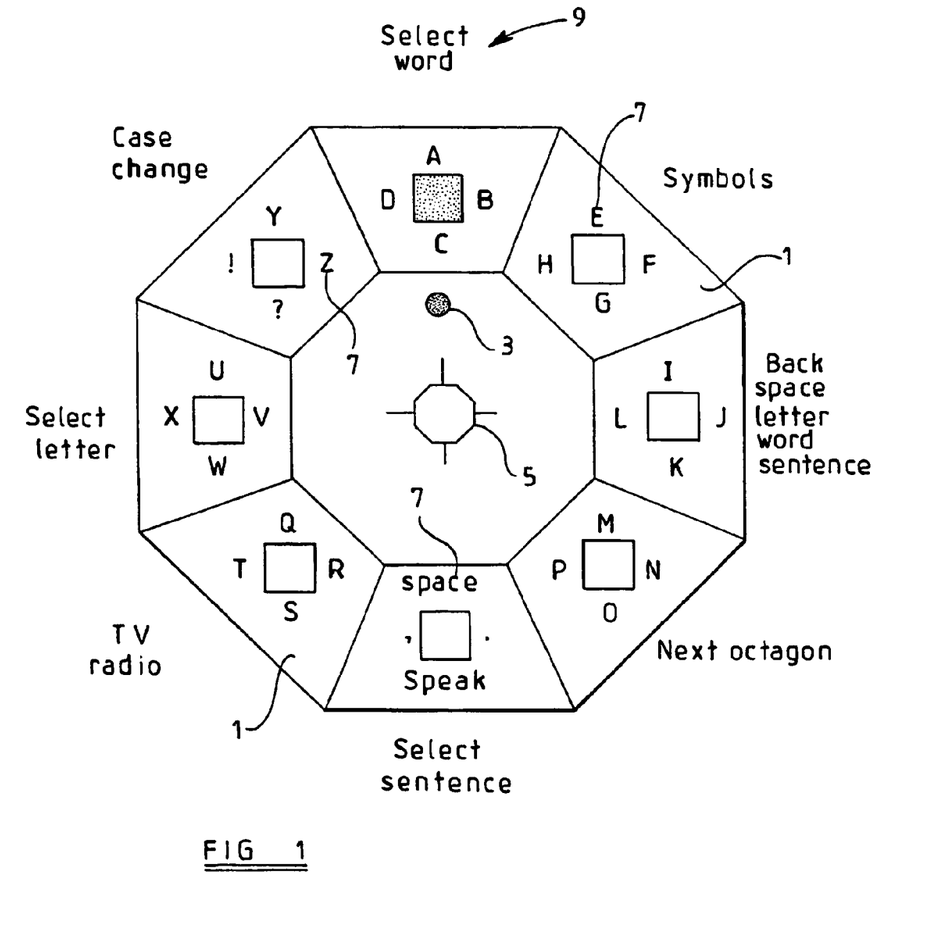
FIG. 1 is a diagrammatic illustration of one embodiment of a communication (symbol entry) system and method according to the present invention.

In contrast to a conventional keyboard, the communication (symbol entry) system shown in FIG. 1 comprises an octagonal arrangement of eight trapezoidal regions 1 which is best suited to use by way of a pointing device in the form of a movable cursor 3, but could alternatively be a finger on a touch pad, or a finger movement in space or a printed sheet of card or the like for manual use. The cursor 3 may be operated by a number of devices such as a mouse or track-ball, touchpad or head-controlled optical tracker. Substantially at the centre of the regions 1 is a central octagonal region 5 which can be used for initiating symbol entry and indicating completion of a symbol entry cycle.

The cursor 3 is moved from the central region 5 into one of the trapezoidal regions 1 to activate a number of symbols 7. For example, the cursor may be moved up to activate the letters A, B, C and D. The cursor 3 is then moved out of the activated region 1 in a predetermined direction (bearing) to select the desired letter, for example horizontally to the right to select the letter B. The cursor 3 is then returned to the central region 5 to initiate selection of the next symbol. The eight regions 1 and four (orthogonal) directions for each region enable any one of thirty-two symbols 7 to be readily selected.

Around the periphery of the octagonal arrangement of regions 1 can be provided a number of mode change regions 9 which can be used, for example where the regions 1 are displayed on a computer or like screen, to change the nature of the regions displayed so as to provide a different set of symbols 7 such as to change between lower case and upper case, to display numerals or control domestic or other appliances. Thus, the user can toggle between a number of different sets of symbols.

Figure 2:
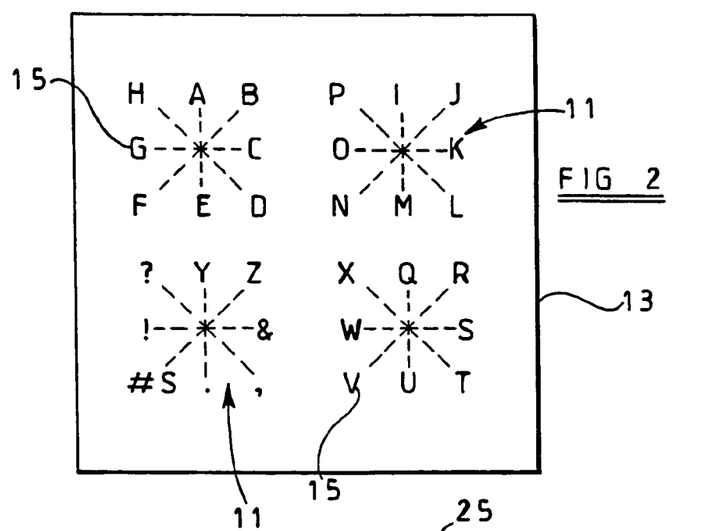
FIG. 2 is a diagrammatic illustration of another embodiment of a communication (symbol entry) system and method according to the present invention.

The communication (symbol entry) system shown in FIG. 2 comprises a quadrilateral (or orthogonal) arrangement of regions 11 provided on a touch-sensitive pad 13 (such as that found on many portable computers) or a touch-sensitive screen and which may be operated by a pointing device in the form of a single finger or pointing stick. Each region 11 has eight symbols 15 associated with it to allow selection of any one of those symbols by movement of the pointing device in the appropriate direction. When operated by finger, although only a single finger should touch the pad 13 at any one time, one to four fingers can actually be used for text entry. Where four fingers are to be used, one for each region, a horizontal layout of the four regions 11 is preferred to the quadrilateral arrangement shown in FIG. 2. The position of a finger within a region 11 is not critical and, although the direction of movement needs to distinguish between adjoining directions, the precise direction is not critical and operation of the system is very user-friendly.

A further option when employing a touch-sensitive pad is the use of "hover film" or the like which allows the user to rest one or more fingers on a surface without triggering the touch-sensitive pad unless a predetermined downward pressure is applied to the hover film. Such an arrangement is particularly convenient for applications where there is no other form of support for the fingers being used. The hover film may comprise an elastomeric film stretched about 1 mm above the touch-sensitive pad or may comprise a pressure-sensitive sensor within the touch-sensitive pad itself. A touch-sensitive pad has the advantage that it is continuous, flat and smooth and has no moving parts. Such a pad is easy to clean and can readily be re-configured to adapt to changing fashion in consumer goods.

Clearly, the use of a touch-sensitive pad allows further possibilities in addition to symbol entry. For example, the touch-sensitive pad can be used for conventional mouse cursor control, with either a region of the pad being dedicated to mouse control, or by providing means to toggle between symbol entry and mouse control, this being a straightforward task requiring no inventive capability. Alternatively, the touch-sensitive pad can have other dual or multiple functions such as the ability to toggle to standard QWERTY text entry and/or to allow handwritten input.

It should be noted the touch sensitive pad does not need to be integral with any apparatus with which it communicates, such as computer or mobile telephone, and can communicate by way of a remote link such as wire, radio or infra-red. This facilitates location of the touch-sensitive pad in a convenient position and/or orientation. However, a preferred location for the touch sensitive pad is adjacent to a display in order that the user is oriented to the display and can map intuitively between the display and the touch sensitive pad.

The use of an octagonal or quadrilateral layout of regions allows for intuitive and physiologically convenient movements (swiping) in up-down, side-to-side or diagonal directions without the need for undue precision. In the embodiments of both FIG. 1 and FIG. 2 the symbol selected is dependent on the combination of the location of a movement of a pointing device and the direction of that movement. While other numbers of regions and directions could be used, the use of eight or four locations with either four or eight directions provides for very user-friendly and intuitive movements while at the same time providing a sufficient number of symbols for a useful text entry system. Additional functions and/or symbols can be obtained by allocating a key to change the symbols associated with a region, for example to upper case, numerals, or to control other functions (for example domestic appliances such as televisions and/or hifi systems). To assist in orientating the pointing device, the surface of the touch-sensitive pad or screen (or other symbol entry surface or means) may be provided with tactile means, such as vertical and/or horizontal grooves.

The symbols may provide for the letter-for-letter entry of text or alternatively may be used as the input for a text input system involving disambiguation such as that described in WO-A-9833111. The system may incorporate an audio or video/visual response or output corresponding for example either to the contact and movement of the pointing device or to the symbol or symbols entered in order to provide the user with feedback that the desired symbol or symbols has or have been selected. Additionally, the entry of one or more symbols may be used as part of a prediction means for a letter, word or the like in known manner. Moreover, the communication (symbol entry) system and method according to the invention may incorporate a spell checker in order to eliminate typographical errors resulting, for example, from selecting the wrong symbol in any particular region (such as by selecting the incorrect adjacent direction of movement) or from selecting the wrong region, but making the movement in the correct direction.

The symbols may also be used to generate macros or strings of characters, for example to control the operating mode of a mobile telephone.

Figure 3A:
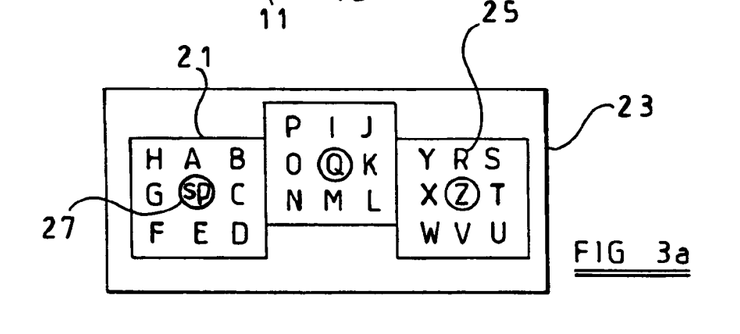
FIGS. 3a, 3b and 3c are a diagrammatic illustration of an embodiment of a communication (symbol entry) system and method according to the present invention which is a development of that shown in FIG. 2.
Figure 3B:
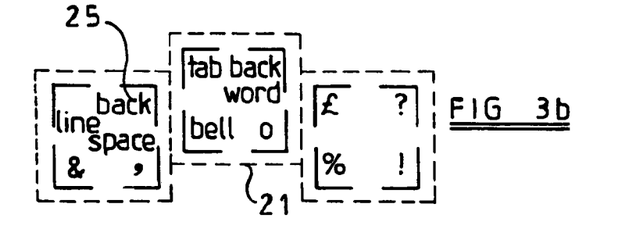
Figure 3C:
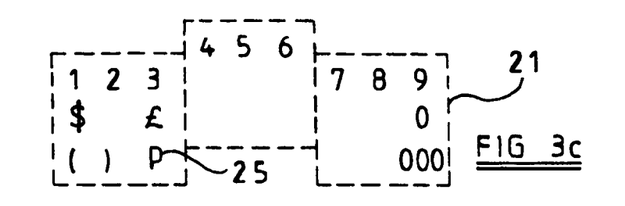

The communication (symbol entry) system shown in FIGS. 3a, 3b and 3c is a development of that shown in FIG. 2. As shown in FIGS. 3a, 3b and 3c there are three regions 21 provided on a touch-sensitive pad 23 (or, alternatively, each region may comprise a touch sensitive pad), each of which regions may be operated by a pointing device in the form of a separate finger. To facilitate operation of the communication (symbol entry) system the central region is displaced relative to the outer regions to accommodate the longer middle finger. Each region 21 has eight symbols 25 associated with it around the periphery thereof in a predetermined arrangement at the corners of a square and substantially midway between adjacent corners to allow selection of any one of those symbols by movement of a finger in the appropriate direction and a ninth symbol 27 which is selected by a tapping motion within the appropriate region 21. Although the arrangement of symbols could be altered, in the illustrated embodiment as shown in FIG. 3a lower case letters are selected by a simple swiping movement in the appropriate direction (up, down, sideways or diagonal). Upper case letters are selected by holding a finger within the required region for a predetermined time at the beginning and/or end of a letter selection movement or by determining the speed of movement (e.g. slow for upper case, fast for lower case). Further symbols are selected as shown in FIG. 3b by a predetermined right-angled swiping movement involving a combination of an up or down movement followed by a sideways movement or vice versa. Still further symbols as shown in FIG. 3c are selected by a swiping movement in a predetermined direction followed by a further swiping movement reversing the first movement (that is a back-and-forth movement).

The use of three regions 21, allowing three finger operation, is a good compromise as regards size and ease of operation. The user's thumb and fourth finger can act as supports for the three remaining fingers and maintain the three remaining fingers just above the respective region. The eight directions of movement facilitate reliable and convenient symbol selection, combining a sufficient number of alternatives while avoiding a need for unrealistic precision. The ninth "tap" movement provides an intuitive selection for a space and permits selection from sufficient symbols to define the entire alphabet with only three regions. The selection of upper case letters by a swiping movement followed by a dwell is simple and intuitive to use. The right-angle movements of FIG. 3b and the swipe and return movements of FIG. 3c are simple and efficient to use (and are readily detected) and avoid the need to toggle between different modes in order to select further sets of symbols.

Figures 4A, 4B, 6A:
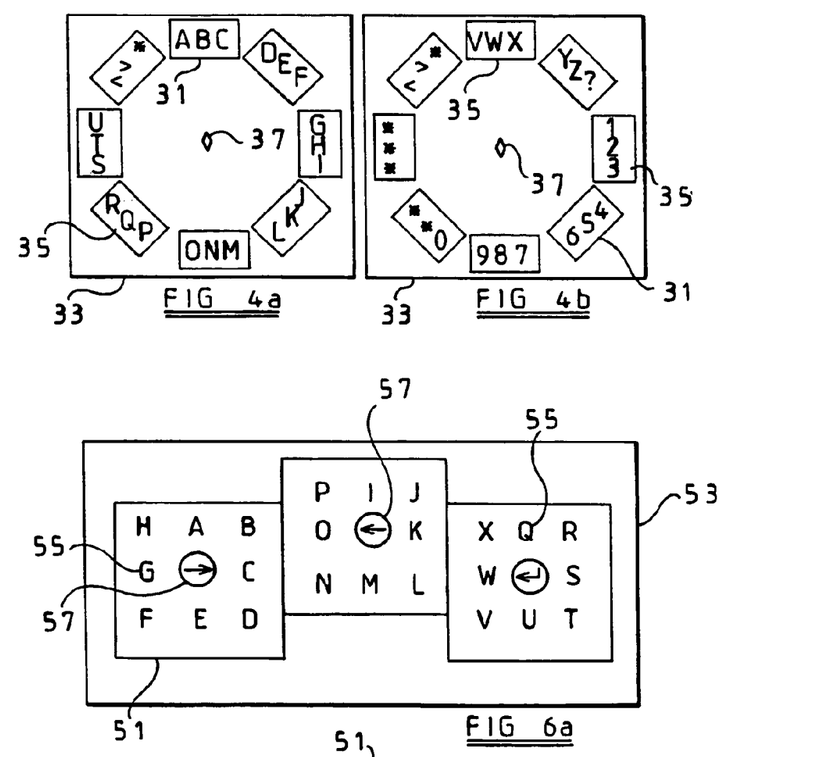
FIGS. 4a and 4b are a diagrammatic illustration of an embodiment of a communication (symbol entry) system and method according to the present invention which is a development of that shown in FIG. 1.
FIGS. 6a, 6b and 6c are a diagrammatic illustration of an embodiment of a communication (symbol entry) system and method according to the present invention which is a development of that shown in FIGS. 3a, 3b and 3c.

The communication (symbol entry) system shown in FIGS. 4a and 4b is a development of that shown in FIG. 1. As shown in FIGS. 4a and 4b there is a single region having marked thereon eight rectangular cells 31 provided on a touch-sensitive pad 33 or screen such as the face of a watch or the like, which cells may be operated by a suitable pointing device such as a pointing stick or finger. As with the embodiment of FIG. 1, the eight cells 31 are generally arranged in the form of an octagon. Each cell 31 has three symbols 35 associated with it to allow selection of any one of those symbols by movement of the pointing device firstly in the appropriate direction for that cell 31 and secondly either further in a radial direction for the middle symbol or, for the outer symbols, in the circumferential direction of the required symbol associated with the desired cell. Although the arrangement of symbols could be altered, in the illustrated embodiment as shown in FIG. 4a lower case letters are selected by a simple straight or right-angle swiping movement in the appropriate direction. Upper case letters are selected by holding the pointing device stationary at the beginning and/or end of the swiping movement for a predetermined time or by detecting a relatively slow movement. By tapping anywhere in the octagon it is possible to toggle between the first set of symbols and a second set of symbols as shown in FIG. 4b, and an individual symbol from the second set can be chosen in the same way as described above in respect of FIG. 4a.

Figure 5:
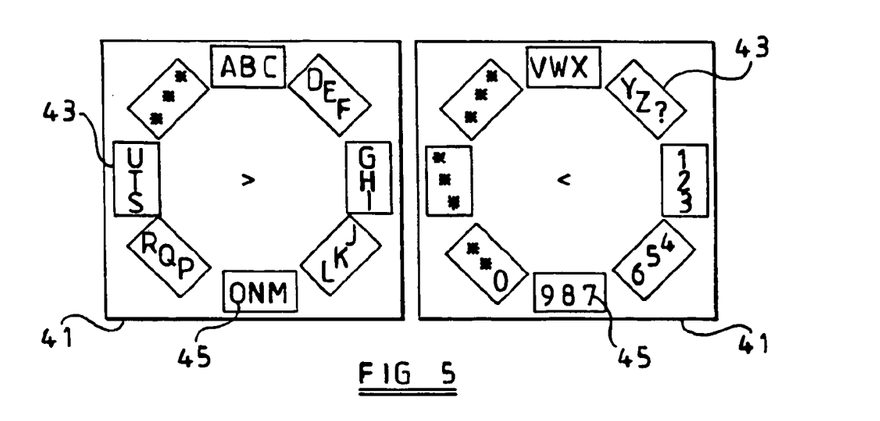
FIG. 5 is a diagrammatic illustration of an embodiment of a communication (symbol entry) system and method according to the present invention which is a development of that shown in FIGS. 4a and 4b.

The communication (symbol entry) system shown in FIG. 5 is a modification of that shown in FIGS. 4a and 4b and can advantageously be used where there is sufficient space for two regions in the form of two touch-sensitive pads 41 or screens. On each pad (region) 41 there are defined eight rectangular cells 43 arranged generally in the form of an octagon and in operation the two touch-sensitive pads of FIG. 5 are used in the same way as the single pad of FIGS. 4a and 4b, except there is no need to toggle between two sets of symbols 45.

It should be noted the alphabetic layouts of FIGS. 4 and 5 (and the other embodiments described herein) can be replaced by alternative layouts, for example employing the relative frequency of use of the various letters as a criterion for determining symbol location.

Figure 6B:
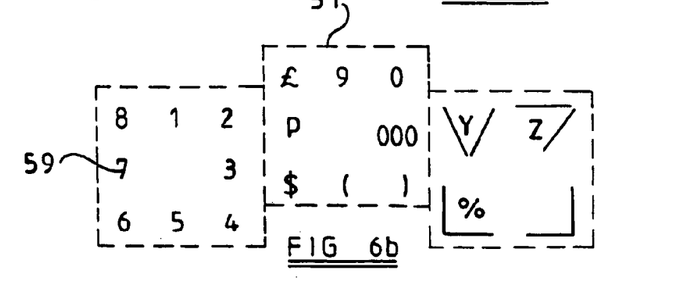
Figure 6C:
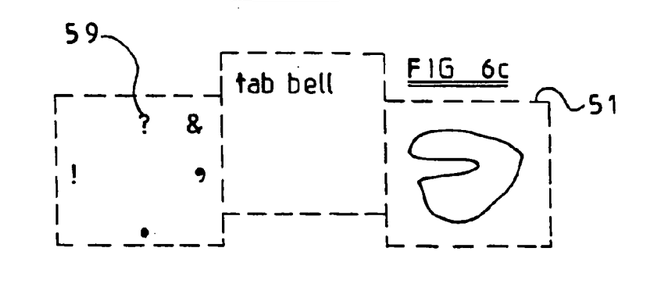

The communication (symbol entry) system shown in FIGS. 6a, 6b and 6c is a modification of that shown in FIGS. 3a, 3b and 3c. As with FIGS. 3a, 3b and 3c, there are three regions 51 provided on a touch-sensitive pad 53 (or three separate touch-sensitive pads) or screen, each of which regions 51 may be operated by a pointing device in the form of a separate finger. As in FIG. 3, the central region in FIG. 6 is displaced (offset) to accommodate the longer middle finger. Each region 51 in FIG. 6a has eight symbols 55 associated with it and disposed around the periphery thereof in a predetermined arrangement at the corners of a square and substantially midway between adjacent corners to allow selection of any one of those symbols by movement of a finger in the appropriate direction and a ninth symbol 57 which is selected by a tapping motion within the appropriate region. As with FIG. 3a, in the embodiment of FIG. 6a lower case letters are selected by a simple swiping movement in the appropriate direction (up, down, sideways or diagonal) and upper case letters are selected by additionally holding the finger within the selected region 51 for a predetermined time at the end of a letter selection movement. Further symbols 59 are selected as shown in FIG. 6b either by holding the finger stationary for a predetermined time at the beginning of a symbol selection movement or by making a predetermined multidirectional swiping movement, such as those illustrated in the upper part of the right-hand region of FIG. 6b in which the movement at least partly mimics the shape of the symbol concerned. Still further symbols 59 as shown in FIG. 6c are selected by a swiping movement in a predetermined direction followed by a further swiping movement reversing the first movement (that is a back-and-forth movement) and by more complex movements mimicking the shape of the symbol concerned. Such complex movements may mimic symbols such as %, & and @ or may permit a sketch to be made.

Figure 7A:
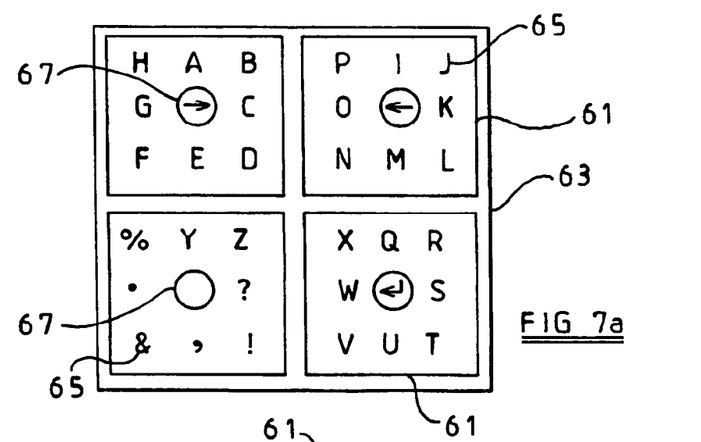
FIGS. 7a and 7b are a diagrammatic illustration of an embodiment of a communication (symbol entry) system and method according to the present invention which is a development of that shown in FIG. 2.
Figure 7B:
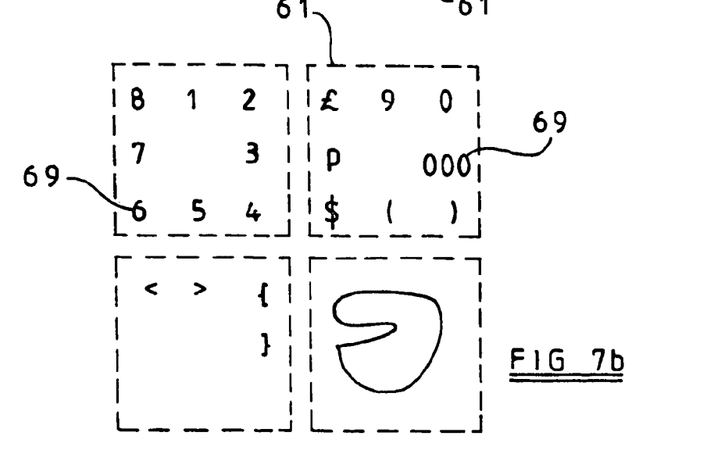

The communication (symbol entry) system shown in FIGS. 7a and 7b is a development of that shown in FIG. 2. As shown in FIGS. 7a and 7b there are four regions 61 provided on a touch-sensitive pad 63 or screen and arranged in a quadrilateral, each of which regions 61 may be operated by a pointing device in the form of a single finger or pointing stick. Each region 61 has eight symbols 65 associated with it and disposed around the periphery thereof (for example at the corners of a square and midway between adjacent corners) to allow selection of any one of those symbols by movement of a finger or the like in the appropriate direction and a ninth symbol 67 which is selected by a tapping motion within the appropriate region. Although the arrangement of symbols could be altered, in the illustrated embodiment as shown in FIG. 7a lower case letters are selected by a simple swiping movement in the appropriate direction (up, down, sideways or diagonal), while upper case letters are selected by holding a finger or the like within the desired region 61 for a predetermined time at the end of a symbol selection movement. Further symbols 69 are selected as shown in FIG. 7b by holding a finger or the like within the desired region for a predetermined time at the start of a symbol selection movement and by more complex movements mimicking the shape of the symbol concerned. Such complex movements may mimic symbols such as £ and $ or may permit a sketch to be made.

Figure 8:
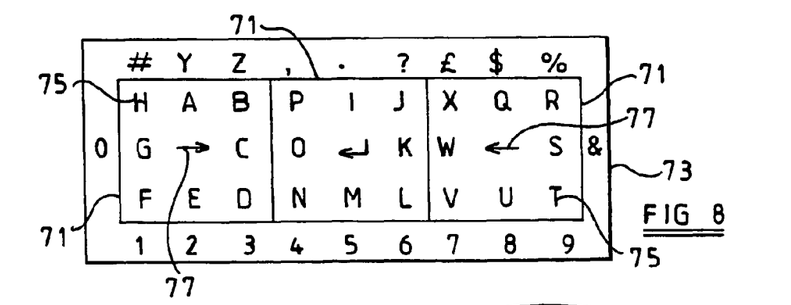
FIG. 8 is a diagrammatic illustration of an embodiment of a communication (symbol entry) system and method according to the present invention which is a modification of that shown in FIGS. 3a, 3b and 3c.

The communication (symbol entry) system shown in FIG. 8 is a modification of that shown in FIGS. 3a, 3b and 3c. There are three regions 71 provided on a touch-sensitive pad 73 (or, alternatively, each region may comprise a touch sensitive pad), each of which regions may be operated by a pointing device in the form of a separate finger. To facilitate operation of the symbol entry system the central region may be displaced (not shown in FIG. 8) relative to the outer regions to accommodate the longer middle finger. Each region 71 has eight symbols 75 associated with it around the periphery thereof in a predetermined arrangement at the corners of a square and substantially midway between adjacent corners to allow selection of any one of those symbols by movement of a finger in the appropriate direction and a ninth symbol 77 which is selected by a tapping motion within the appropriate region 71. Although the arrangement of symbols could be altered, in the illustrated embodiment as shown in FIG. 8 the inner symbols are selected by a simple swiping movement in the appropriate direction (up, down, sideways or diagonal). The outer symbols are selected by a swiping movement in a predetermined direction followed by a further swiping movement reversing the first movement (that is a back-and-forth movement). Upper case letters are selected by holding a finger within the required region for a predetermined time at the beginning or end of a letter selection movement (for example a dwell at the beginning of a movement for the inner symbols and a dwell at the end of a movement for the outer symbols) or by determining the relative speed of movement of the pointing device as described hereinabove. Space, backspace and new line symbols are selected by a tap within the appropriate region, while the # symbol is reserved for toggling between the illustrated symbols and a further set of symbols or for toggling a further function such as to activate speech output.

Figure 9:
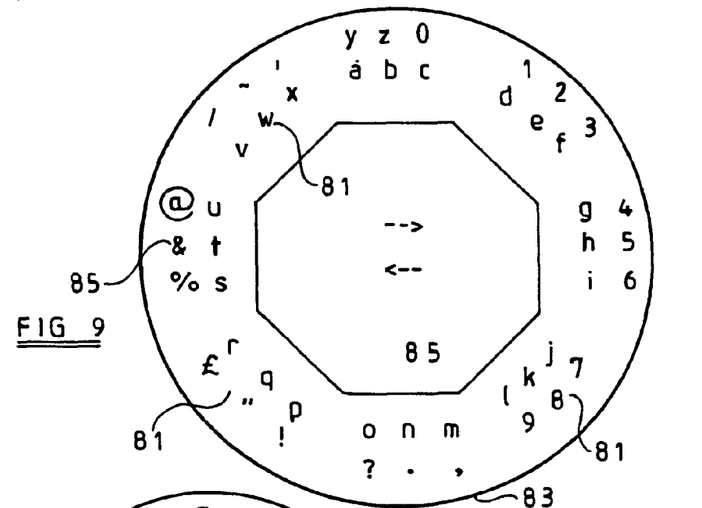
FIG. 9 is a diagrammatic illustration of an embodiment of a communication (symbol entry) system and method according to the present invention which is a modification of FIGS. 4a and 4b.

The communication (symbol entry) system shown in FIG. 9 is a modification of that shown in FIGS. 4a and 4b. In the embodiment of FIG. 9 there is one region defining eight cells 81 provided on a touch-sensitive pad 83 or screen such as the face of a watch or the like, which cells may be operated by a suitable pointing device such as a pointing stick or finger. As with the embodiment of FIGS. 4a and 4b, the eight cells 81 are generally arranged in the form of an octagon. Each cell 81 has two sets of three symbols 85 associated with it, the inner set being selected by a simple swiping movement in the direction of the appropriate cell and the outer set being selected by a dwell of predetermined duration at the beginning of the swiping movement. The desired symbol is then selected by a radial swiping movement for the middle symbol or, for the outer symbols, by a swiping movement in the appropriate circumferential direction of the required symbol after movement towards the desired cell. A single tap anywhere in the octagon represents a space, while a double tap represents a backspace.

Figure 10:
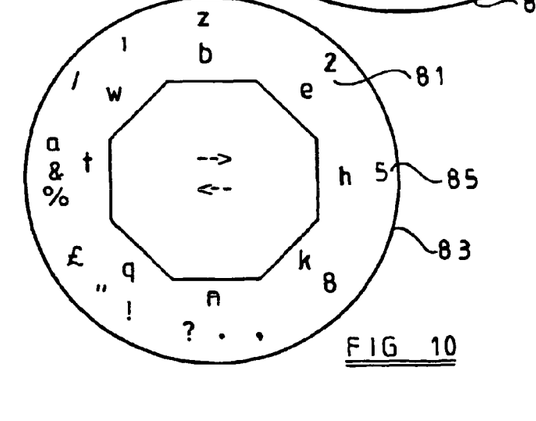
FIG. 10 is a diagrammatic illustration of a modification of the communication (symbol entry) system and method of FIG. 9.

FIG. 10 is a simplification of the embodiment of FIG. 9 in that only the central symbol of most sets is shown to remind the user of the symbols of each set. The arrangement of FIG. 10 improves visibility of the symbols displayed where the overall symbol entry area is relatively small.

It should be noted the number of symbols in each set could be increased from three to four if two symbols can be selected by the radial swiping movement, the outer symbol being selected by a single outward radial movement and the inner symbol being selected by a radially inward swiping movement after the outward movement. In this way the eight separate cells can be used to enter up to sixty-four symbols.

Figure 11:
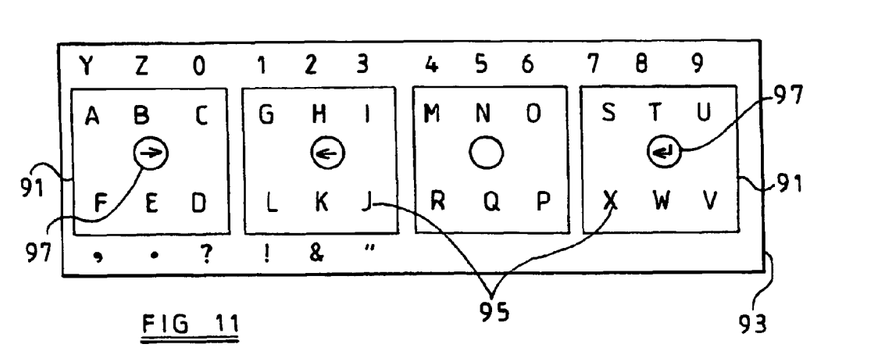
FIG. 11 is a diagrammatic illustration of an embodiment of a communication (symbol entry) system and method according to the present invention which is a modification of that shown in FIGS. 3a, 3b and 3c.

The communication (symbol entry) system shown in FIG. 11 is a modification of that shown in FIGS. 3a, 3b and 3c. There are four regions 91 provided on a touch-sensitive pad 93 (or, alternatively, each region may comprise a touch sensitive pad), each of which regions may be operated by a pointing device in the form of a separate finger. Each region 91 has six symbols 95 associated with it around the periphery thereof in a predetermined arrangement at the corners of a square and at the top and bottom substantially midway between adjacent corners to allow selection of any one of those symbols by movement of a finger in the appropriate direction and a seventh symbol 97 which is selected by a tapping motion within the appropriate region 91. The avoidance of horizontal movements can be more ergonomically efficient in certain circumstances. Although the arrangement of symbols could be altered, in the illustrated embodiment as shown in FIG. 11 most lower case letters (the inner symbols) are selected by a simple swiping movement in the appropriate direction (up, down or diagonal). The outer symbols are selected by a swiping movement in the desired direction followed by a movement in the reverse direction. Upper case letters are selected by holding a finger within the required region for a predetermined time at the beginning and/or end of a letter selection movement. Further symbols, such as space, backspace and new line, are selected by tapping within the appropriate region 91.

Figure 12:
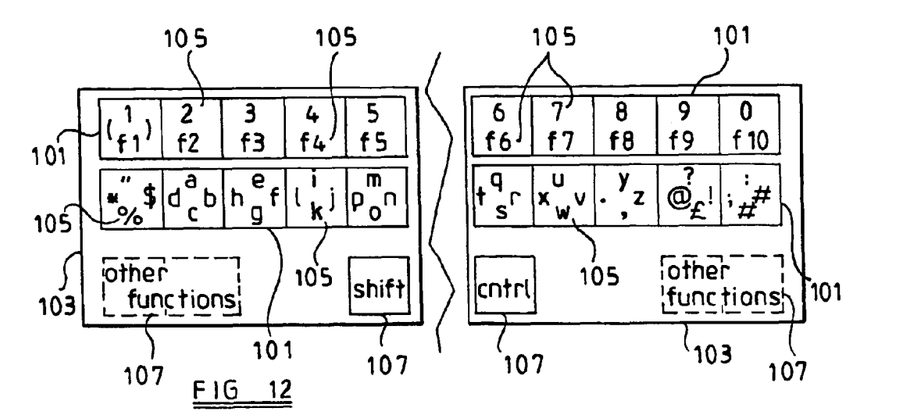
FIG. 12 is a diagrammatic illustration of an embodiment of a communication (symbol entry) system and method according to the present invention and adapted for two-handed use.

The communication (symbol entry) system shown in FIG. 12 is adapted for use by two hands and comprises an arrangement of two rows of five regions 101 for each hand provided on a touch-sensitive pad 103 or a touch-sensitive screen and which may each be operated by a pointing device in the form of a different finger. Each region 101 in the lower rows has four symbols 105 (primarily letters in the illustrated embodiment) associated with it to allow selection of any one of those symbols by movement of the pointing device in the appropriate up, down or sideways direction, while each region 101 in the upper rows generally has two symbols 105 (primarily numerals and the usual PC function keys) associated with it to allow selection of any one of those symbols by movement in the appropriate up or down direction. Further regions 107 may be provided for additional functions such as shift and control. Such further regions 107 may comprise conventional keys and/or switches. The arrangement of FIG. 12, by employing both hands, provides a particularly simple (and therefore fast) set of finger movements for symbol entry.

Thus the present invention is able to provide a compact, low-cost, user-friendly symbol/text entry system which is suitable for use in a wide range of applications, including personal computer access and text input for mobile computer systems, numeric input for dialling with mobile telephones and text entry. If desired, the symbol entry system and method may be adapted to employ the user's thumb to enter a space. An additional region may be provided in an area where the thumb would naturally fall and can either enter a space when the thumb is urged against the touch-sensitive pad or, when the thumb is used as a support, to enter a space when the thumb is lifted from the pad.

Figure 13:
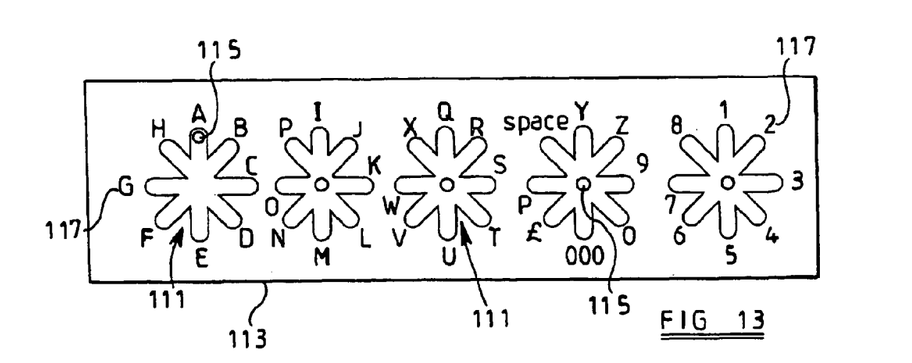
FIG. 13 is a diagrammatic illustration of one embodiment of a communication (symbol output) system and method according to the present invention.

FIG. 13 illustrates an embodiment of a communication (symbol output) system and method according to the present invention in which a linear array of symbol output regions 111 are arranged on an output pad 113 or the like. Each output region 111 is in the form of an octagonal gate array which allows movement of a symbol indicating pin 115 in orthogonal and diagonal directions in order to indicate different symbols 117. Movement of the pins 115 may be controlled by any suitable linear actuating means. Thus movement of a single one of the pins 115 in a predetermined direction can be used to indicate a single symbol 117 and a sequence of such movements can be used to indicate a sequence of symbols. The sequence of symbols can be identified visually or can be identified by movement against a user's skin (such as the user's fingers or the palm of a hand). As an alternative to a movable pin some form of vibrating means, such as a piezo device or an extending pin, can be located at each symbol. The embodiment of FIG. 13 could alternatively be employed as a symbol input system with tactile guidance from the pins 115.

Figure 14:
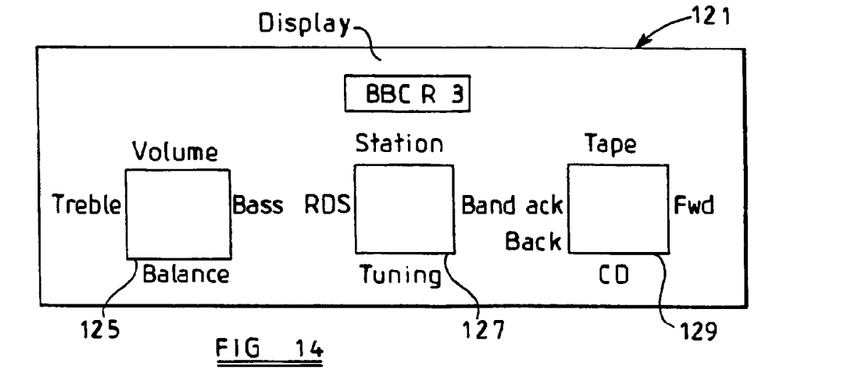
FIG. 14 is a diagrammatic illustration of an embodiment of a communication system according to the present invention in the form of a vehicle audio system.

FIG. 14 shows an embodiment of a communication (function or data entry) system according to the invention embodied into a radio/cassette/CD audio player 121 for a vehicle. The player 121 is only shown diagrammatically but includes a display 123 for showing the function, radio station, tape direction, track or the like selected and/or other information and a plurality of generally square regions 125, 127 and 129 for controlling the player.

In the illustrated embodiment, a left-hand region 125 is used to control volume and balance. Thus upward movement over the surface of the region 125 selects volume control, while downward movement selects balance control.

Subsequent movement (or initial movement if the required control has previously been selected or is predetermined as a default control) to the left increases the treble component by a predetermined unit amount, while movement to the left followed by a dwell at the end of the movement continues to increase the treble component for the duration of the dwell. The bass component can similarly be increased either by a predetermined unit amount with a single movement to the right, while movement to the right followed by a dwell continues to increase the bass component for the duration of the dwell.

The treble or bass component can be decreased by a predetermined unit amount by a movement in the appropriate left or right direction immediately followed by a return movement in the opposite direction. Continued decrease in either the treble or the bass component can be obtained with a dwell at the end of the return movement.

In the illustrated embodiment a central region 127 can be used to control radio functions with movements on the surface of the region in predetermined directions being used to select various functions such as RDS, BAND, STATION or TUNING. STATION can be used, for example, in a two-stage selection process with a subsequent movement in one of eight orthogonal or diagonal directions being used to select one of eight preset stations.

A right hand region 129 can be used to control other functions of the player such as selecting TAPE or CD and for skipping BACK or FORWARD through the tracks on the tape or CD.

Thus the communication (function or data entry) system shown in FIG. 14 effectively allows control of an analogue function (such as volume) with a single movement on a touch-sensitive pad or the like.

Figures 15, 16:
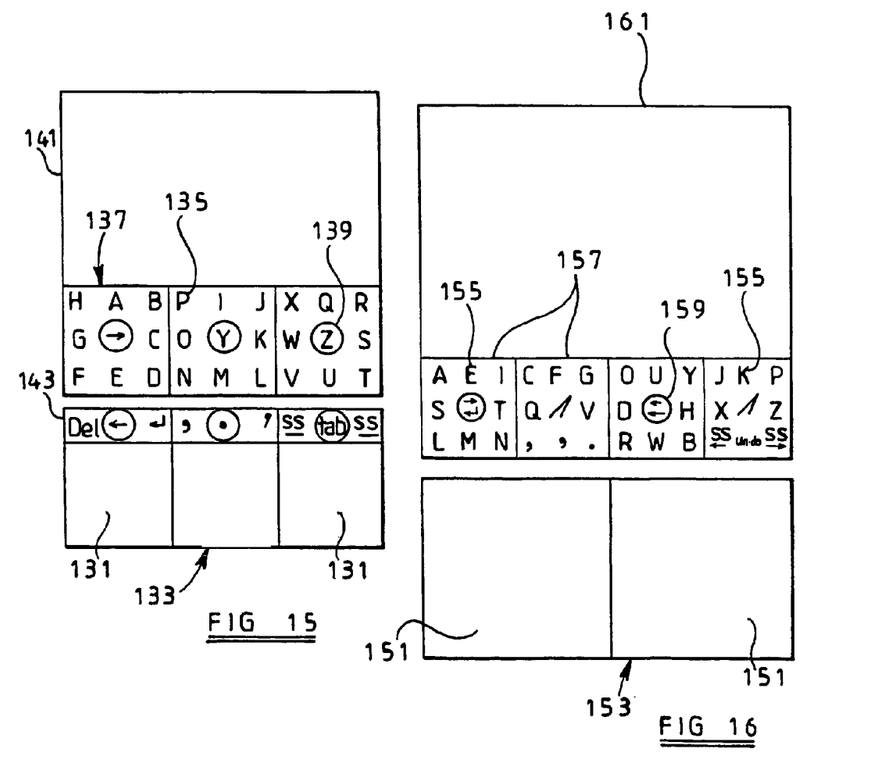
FIG. 15 is a diagrammatic illustration of an embodiment of a communication (symbol entry) system and method according to the present invention which is similar to that shown in FIG. 3.
FIG. 16 is a diagrammatic illustration of an embodiment of a communication (symbol entry) system and method according to the present invention which is similar to that shown in FIG. 15.

The communication (symbol entry) system shown in FIG. 15 is similar to that shown in FIGS. 3a, 3b and 3c. As with FIGS. 3a, 3b and 3c, there are three regions 131 provided on a touch-sensitive pad 133 (or three separate touch-sensitive pads) or screen, each of which regions 131 may be operated by a pointing device in the form of a separate finger or a single finger. Each region 131 in FIG. 15 has eight symbols 135 associated with it and displayed in an arrangement 137 adjacent to (above) each region in a predetermined configuration at the corners of a square and substantially midway between adjacent corners to allow selection of any one of those symbols by movement of a finger in the appropriate direction (orthogonal or diagonal) within the region concerned corresponding to the location of the desired symbol and a ninth symbol 139 which is selected by a tapping motion within the appropriate region. The provision of a separate display 137 ensures the user's finger or other pointing device does not obscure the symbols being accessed. As with FIG. 3a, in the embodiment of FIG. 15 lower case letters are selected by a simple swiping movement in the appropriate direction (up, down, sideways or diagonal) and upper case letters are selected by additionally holding the finger within the selected region 131 for a predetermined time at the beginning or end of a letter selection movement or by employing a relatively slow movement of the pointing device. The arrangements 137 of symbols can either be permanent of may be temporary, for example forming the lower part of a display 141, the temporary arrangement of symbols being activated or de-activated with a suitable movement of the pointing device or other action as will be described hereinafter.

Each of the nine contiguous sub-areas within the display area has an associated symbol and appropriate pointing direction. Each symbol may substantially fill its sub-area and can therefore be relatively large. Thus the display area is substantially filled with symbols in a close packed manner, so wasting little display area. Consequently, the symbols are clear to the user and the appropriate pointing directions are intuitive from the symbol locations.

Intermediate the regions 131 and the arrangements 137 of symbols are small touch-sensitive regions 143 having permanently marked thereon a small number of symbols which can be selected by a lateral movement of the pointing device (to select a symbol at one side of a region) or with a tapping motion (to select the central symbol). Thus, one of the small regions 143 can be used to change the selected symbols, the further symbols (in the case of symbols that are not marked permanently on the system) being displayed in place of the original symbols. The display of only a single set of symbols allows the symbol display to be simple with each symbol being relatively large and with a clear direction associated with it. In this way, the symbol display is clear to the user and the appropriate pointing direction to access the symbols is also clear. Where the symbols are displayed temporarily, once the user has learnt the location of the symbols he can de-activate the symbol display 137 and consequently enlarge the general display 141 of the apparatus (such as a WAP telephone or PDA device) into which the communication system of the present invention is incorporated. As will be appreciated, provision of temporarily displayed symbols in this way allows the symbols to be changed with software and many layers of menu can be scrolled through. Different languages can be easily accommodated and layouts can be personalised by the user if desired.

The communication (symbol entry) system shown in FIG. 16 is similar to that shown in FIG. 15. In contrast to FIG. 15, there are two regions 151 provided on a touch-sensitive pad 153 (or two separate touch-sensitive pads) or screen, each of which regions 151 may be operated by a pointing device in the form of a separate finger or a single finger. Each region 151 in FIG. 16 has sixteen symbols 155 associated with it and displayed in two side-by-side arrangements 157 adjacent to (above) each region each in a predetermined arrangement at the corners of a square and substantially midway between adjacent corners to allow selection of any one of those symbols by movement of a pointing device (such as a finger) in the appropriate direction (orthogonal or diagonal) within the region corresponding to the location of the desired symbol. Symbols for the left-hand arrangement of each pair are selected by a simple swiping movement in the appropriate direction. In the case of the right-hand arrangement of each pair the relevant symbol is selected by a to-and-fro (forwards and backwards) movement as indicated in the middle of the right-hand arrangement. In the case of the left-hand arrangement, a ninth symbol 159 can be selected by a tapping motion within the appropriate region. As with the embodiment of FIG. 15, the provision of separate displays 157 ensures the user's finger or other pointing device does not obscure the symbols being accessed. The symbols are arranged in FIG. 16 such that the most frequently used symbols are in each of the left-hand arrangements (and can therefore be accessed by a single movement) while the least frequently used symbols are in the right-hand arrangements. As with the embodiment of FIG. 15, lower case letters are selected by a simple swiping movement in the appropriate direction (up, down, sideways or diagonal) and upper case letters are selected by additionally holding the finger within the selected region 151 for a predetermined time at the beginning or end of a letter selection movement or by employing a relatively slow movement of the pointing device. The arrangements 157 of symbols can either be permanent of may be temporary, for example forming the lower part of a display 161, the temporary arrangement of symbols being activated or de-activated with a suitable movement of the pointing device or other action as indicated (by the legend SS) on the right-hand arrangement of the right-hand region 151.

Thus, a user can change the selected symbols or de-activate the symbols by scrolling through the symbol sets available. The display of two simple sets of symbols allows the symbol display to be straightforward with each symbol being relatively large, but close packed. In this way, the symbol display is clear and understandable to the user while wasting little display area. Once the user has learnt the location of the symbols he can de-activate the symbol display 157 and consequently enlarge the general display 161 of the apparatus (such as a WAP telephone or PDA device) into which the communication system of the present invention is incorporated.

The invention claimed is:

1. A communication system comprising means having a surface and defining a communication region having associated therewith a plurality of symbols and being responsive to movement of a user-controlled pointing device on or proximate said surface, whereby a desired symbol can be selected by detecting movement of the pointing device within the communication region along a predetermined bearing, the predetermined bearing being parallel to a direction of the desired symbol relative to a central region of the communication region, said system being responsive to said user-controlled pointing device independent of the location within said communication region at which movement along said predetermined bearing commences.

2. A communication system as claimed in claim 1, wherein a plurality of symbol entry regions are provided each having associated therewith a plurality of symbols and each being responsive to the user-controlled pointing device whereby a desired symbol can be selected by movement of the pointing device within the communication region with which the desired symbol is associated, along the predetermined bearing.

3. A communication system as claimed in claim 2, wherein there are four communication regions, each region having associated therewith a plurality of symbols arranged in a predetermined manner, a desired symbol being selected by movement within the region having the desired symbol associated therewith along the predetermined bearing relative to the desired symbol.

4. A communication system as claimed in claim 2, wherein there are three communication regions, each region having associated therewith a plurality of symbols arranged in a predetermined manner, a desired symbol being selected by movement within the region having the desired symbol associated therewith along the predetermined bearing relative to the desired symbol.

5. A communication system as claimed in claim 2, wherein there are two communication regions, each region having associated therewith a plurality of symbols arranged in a predetermined manner, a desired symbol being selected by movement within the region having the desired symbol associated therewith along the predetermined bearing relative to the desired symbol.

6. A communication system as claimed in claim 1, wherein two sets of communication regions are provided.

7. A communication system as claimed in claim 1, wherein means is provided for selecting a further symbol arranged within an area encompassed by or adjacent to the first-mentioned symbols of each region by tapping the area within the desired region.

8. A communication system as claimed in claim 1, wherein means is provided for selecting further symbols by employing a different form of movement from that required to select from the basic symbols.

9. A communication system as claimed in claim 8, wherein the further symbols are selected on the basis of the speed of movement of the pointing device.

10. A communication system as claimed in claim 8, wherein the further symbols are selected on the basis of a combination of movements.

11. A communication system as claimed in claim 10, wherein the combination of movements comprise a linear movement with a dwell at the beginning and/or end thereof.

12. A communication system as claimed in claim 10, wherein the combination of movements comprise a linear movement in a first direction followed by a further linear movement reversing the preceding movement.

13. A communication system as claimed in claim 10, wherein the combination of movements comprise two sequential linear movements at a predetermined angle to each other.

14. A communication system as claimed in claim 1, wherein said means having a surface and defining a communication region comprises a touch-sensitive screen.

15. A method of communication in which a plurality of symbols are associated with a communication region and a desired symbol is selected by detecting movement of a user-controlled pointing device on or proximate a surface within the communication region along a predetermined bearing, the predetermined bearing being parallel to a direction of the desired symbol relative to a central region of the communication region, effecting of said selection being independent of the location within said communication region at which movement of the pointing device along said predetermined bearing commences.

16. A method of communication according to claim 15, wherein a plurality of symbol entry regions are provided each having associated therewith a plurality of symbols and each being responsive to the user-controlled pointing device whereby a desired symbol can be selected by movement of the pointing device within the communication region with which the desired symbol is associated, along the predetermined bearing.

17. A method of communication according to claim 16, wherein there are four communication regions, each region having associated therewith a plurality of symbols arranged in a predetermined manner, a desired symbol being selected by movement within the region having the desired symbol associated therewith along the predetermined bearing relative to the desired symbol.

18. A method of communication according to claim 16, wherein there are three communication regions, each region having associated therewith a plurality of symbols arranged in a predetermined manner, a desired symbol being selected by movement within the region having the desired symbol associated therewith along the predetermined bearing relative to the desired symbol.

19. A method of communication according to claim 16, wherein there are two communication regions, each region having associated therewith a plurality of symbols arranged in a predetermined manner, a desired symbol being selected by movement within the region having the desired symbol associated therewith along the predetermined bearing relative to the desired symbol.

20. A method of communication according to claim 15, wherein two sets of communication regions are provided.

21. A method of communication according to claim 15, wherein at least one further region is provided separated from the first-mentioned regions for toggling between the first-mentioned set of symbols and one or more further sets of symbols to be associated with each of the regions.

22. A method of communication according to claim 15, wherein means is provided for selecting a further symbol arranged within an area encompassed by or adjacent to the first-mentioned symbols of each region by tapping the area within the desired region.

23. A method of communication according to claim 15, wherein further symbols are selectable by employing a different form of movement from that required to select from the basic symbols.

24. A method of communication according to claim 23, wherein the further symbols may be selected on the basis of the speed of movement of the pointing device.

25. A method of communication according to claim 23, wherein the further symbols may be selected on the basis of a combination of movements.

26. A method of communication according to claim 25, wherein the combination of movements comprise a linear movement with a dwell at the beginning and/or end thereof.

27. A method of communication according to claim 25, wherein the combination of movements comprise a linear movement in a first direction followed by a further linear movement reversing the preceding movement.

28. A method of communication according to claim 25, wherein the combination of movements comprise two sequential linear movements at a predetermined angle to each other.

29. A method of communication according to claim 15, wherein the region or regions are provided on a touch-sensitive screen.

30. A communication system comprising means having a surface and defining a plurality of communication regions each substantially in the form of a square having symbols associated therewith substantially at corners of the square and substantially midway along each side of the square, each communication region being responsive to movement of a user-controlled pointing device on or proximate the surface of the means having a surface and defining a plurality of communication regions, whereby a desired symbol can be selected by detecting movement of the pointing device on or proximate the surface within said each communication region along a predetermined bearing, the predetermined bearing being parallel to a direction of the desired symbol relative to a central region of said each communication region, said system being responsive to said user-controlled pointing device independent of the location within said each communication region at which movement along said predetermined bearing commences.

31. A communication system as claimed in claim 30 and including a visual output corresponding to the symbol or symbols entered.

* * * * *